(12) United States Patent
Dave

(10) Patent No.: US 8,385,512 B2
(45) Date of Patent: Feb. 26, 2013

(54) ACHIEVING HEARING AID COMPATIBILITY ON HANDSETS WITH LOW ACOUSTIC IMPEDANCE RECEIVERS

(75) Inventor: Ruchir Dave, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 1579 days.

(21) Appl. No.: 11/849,104

(22) Filed: Aug. 31, 2007

(65) Prior Publication Data

US 2009/0060147 A1  Mar. 5, 2009

(51) Int. Cl.
*H04M 11/00* (2006.01)
*H04R 25/00* (2006.01)

(52) U.S. Cl. .......................... 379/52; 381/312

(58) Field of Classification Search ............ 379/52; 381/312–331

See application file for complete search history.

(56) References Cited

U.S. PATENT DOCUMENTS

| | | | |
|---|---|---|---|
| 6,292,571 B1* | 9/2001 | Sjursen | 381/312 |
| 7,978,867 B2* | 7/2011 | Waldron et al. | 381/312 |
| 2006/0013423 A1* | 1/2006 | Wieczorek et al. | 381/315 |
| 2006/0188117 A1* | 8/2006 | Kim | 381/315 |
| 2006/0193485 A1* | 8/2006 | Park | 381/312 |

* cited by examiner

Primary Examiner — Brandon Miller
(74) Attorney, Agent, or Firm — Charles E. Krueger

(57) ABSTRACT

In one embodiment, an equalizer outputs a compensated received signal that flattens the acoustic frequency response characteristic of a handset having a leak tolerant ear piece. A hardware based filter is implemented within the handset having a response matched to the response of the equalizer so that the acoustic and magnetic frequency responses of the handset are substantially flat over the audible frequency range to comply with regulatory requirements.

11 Claims, 4 Drawing Sheets

ACHIEVING HEARING AID COMPATIBILITY ON HANDSETS WITH LOW ACOUSTIC IMPEDANCE RECEIVERS

TECHNICAL FIELD

The present invention relates generally to techniques for controlling the acoustic frequency response and magnetic frequency response of a handset to comply with regulatory requirements.

BACKGROUND OF THE INVENTION

Regulatory agencies in different countries have developed different standards regarding requirements for handset compatibility with hearing aids. When people require the use of a hearing aid while using a telephone, some form of coupling is required between the receiver of the handset and the hearing aid.

One form of coupling is inductive coupling where a hearing aid coil in a handset generates a magnetic field that couples the received voice signal to the hearing aid.

DESCRIPTION OF EXAMPLE EMBODIMENTS

Overview

A technique is described including receiving an uncompensated received signal for driving a voice coil and hearing aid coil included in the receiver of a handset, with the acoustic frequency response characteristic of the handset having a drop between about 1000 and 3000 hertz (Hz) and magnetic frequency response of the handset being substantially flat over the audible range of frequencies when driven by the uncompensated received signal, equalizing the uncompensated received signal to form a compensated received signal where the acoustic frequency response characteristic of the handset is substantially flat over the audible range of frequencies when driven by the compensated received signal, and filtering the compensated received signal applied to the hearing aid coil so that the magnetic frequency response characteristic of the handset is substantially flat over the audible range of frequencies when driven by the compensated received signal.

Description

Reference will now be made in detail to various embodiments of the invention. Examples of these embodiments are illustrated in the accompanying drawings. While the invention will be described in conjunction with these embodiments, it will be understood that it is not intended to limit the invention to any embodiment. On the contrary, it is intended to cover alternatives, modifications, and equivalents as may be included within the spirit and scope of the invention as defined by the appended claims. In the following description, numerous specific details are set forth in order to provide a thorough understanding of the various embodiments. However, the present invention may be practiced without some or all of these specific details. In other instances, well known process operations have not been described in detail in order not to unnecessarily obscure the present invention.

Figure 1:
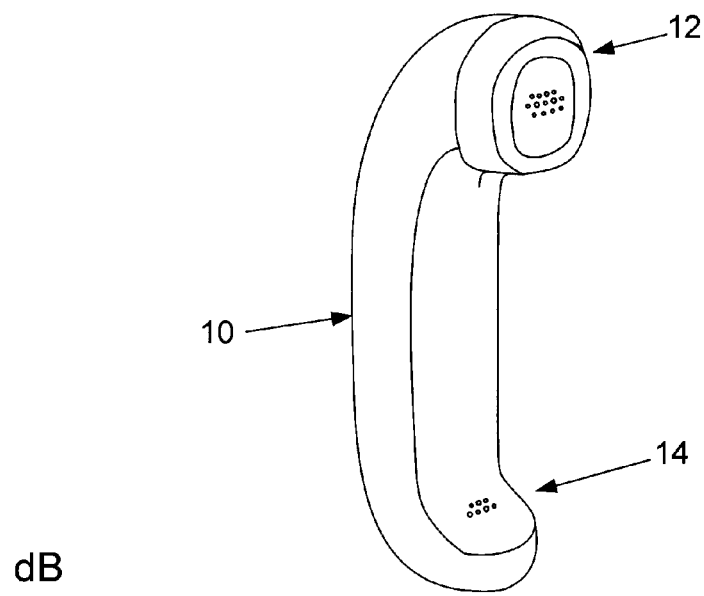
FIG. 1 illustrates an example handset including a mouth piece and an ear piece.

FIG. 1 depicts a handset 10 including an ear piece 12 and a mouthpiece 14. The ear piece 12 is a low acoustic impedance, leak tolerant ear piece that provides good audio quality and allows the user to hear low frequencies without the requirement of a good cup fit over the ear. The ear piece includes a receiver having a voice coil and a hearing aid coil. The voice coil generates an acoustic signal which is audible to the user and the hearing aid coil generates a magnetic field utilized for inductive coupling to a hearing aid.

Figure 2A:
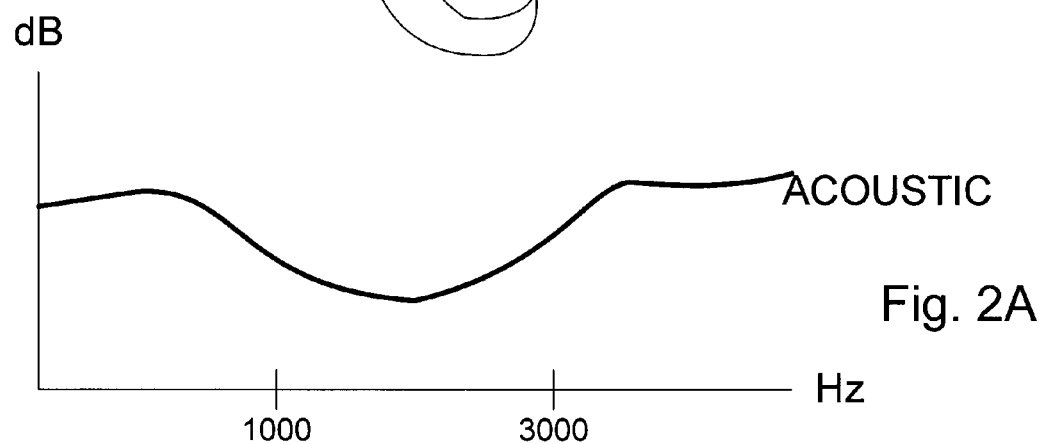
FIGS. 2A and B illustrate example acoustic and magnetic frequency response characteristics of the handset when a signal is applied.
Figure 2B:

The acoustic frequency response characteristic of a handset is measured using a Head and Torso Simulator (HATS). The acoustic frequency response characteristic of the low acoustic impedance handset, when measured using a HATS, has a drop in frequency response between 1000 and 3000 Hz. The magnetic frequency response of the handset is flat. Some countries such as Australia require that both the acoustic and magnetic frequency response characteristics of the handset be substantially flat over the audible range of frequencies. The acoustic and magnetic frequency response characteristics of the handset are depicted in FIGS. 2A and 2B.

Figure 3:
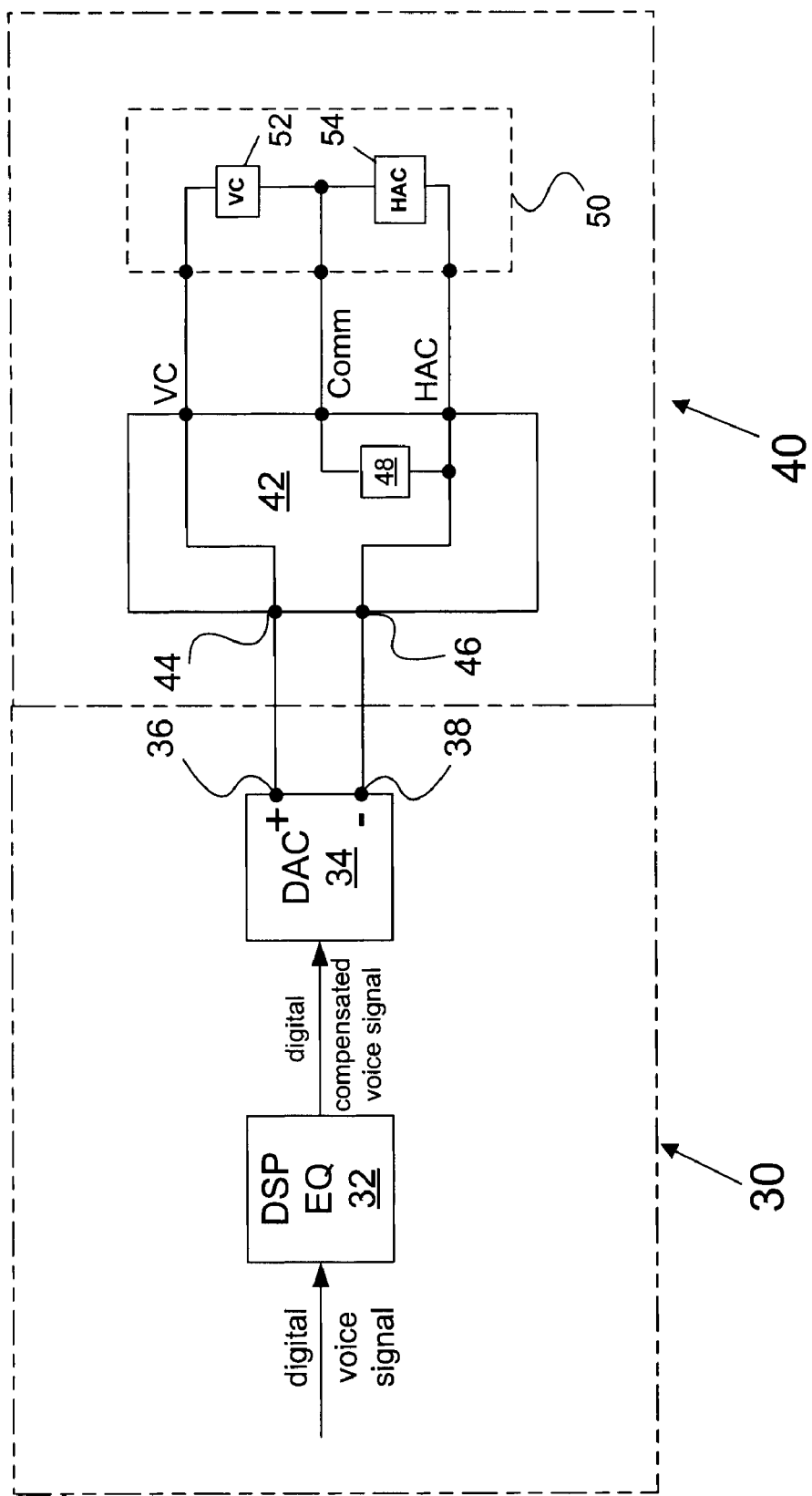
FIG. 3 illustrates an example system for complying with regulatory requirements for the acoustic and magnetic frequency response characteristics of the handset.

An example embodiment will now be described for achieving substantially flat acoustic and magnetic frequency response characteristics of the handset over the audible range of frequencies. FIG. 3 depicts a block diagram of this embodiment.

Referring to FIG. 3, in this embodiment a telephone includes a phone base and a handset. The phone base 30 includes a digital signal processor (DSP) 32 having an input for receiving a digital voice signal and having an output coupled to an input of a digital to analog converter (DAC) 34 that has positive and negative outputs 36 and 38 for supplying an analog voice signal.

The handset 40 includes a printed circuit board and a receiver. The printed circuit board 42 has positive and negative 44 and 46 terminals coupled, respectively, to the positive and negative terminals 36 and 38 of the DAC 34. The printed circuit board 42 also has three additional terminals labeled VC (Voice Coil), COMM (common), and HAC (Hearing Aid Coil). The VC terminal of the printed circuit board is coupled to the positive input 44 of the printed circuit board 42, the HAC terminal is coupled to the negative terminal 46 on the printed circuit board 42 and the COMM terminal is coupled to the first terminal of a filter 48 with the filter having a second terminal coupled in common to the negative terminal 46 and the HAC terminal of the printed circuit board 44.

The receiver 50 includes a voice coil (VC) 52 and a hearing aid coil (HAC) 54 and has VC, COMM, and HAC terminals coupled respectively to the VC, COMM, and HAC terminals of the printed circuit board 42. The VC terminal of the receiver is coupled to a first terminal of the VC 52, the COMM terminal of the receiver is coupled in common to a second terminal input of the voice coil 52 and a first terminal of the hearing aid coil 54, and the HAC terminal of the receiver is coupled to a second terminal of the hearing aid coil 54.

Figure 4A:
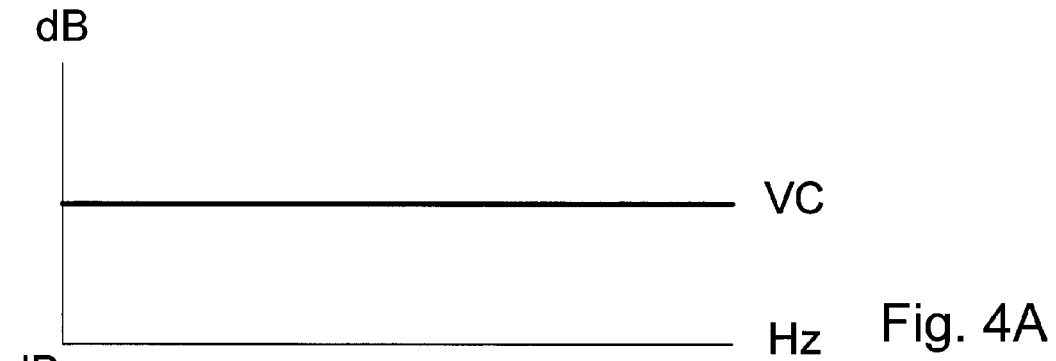
FIGS. 4A and B illustrate example acoustic and magnetic frequency response characteristics of the handset when a compensated received signal is applied.
Figure 4B:
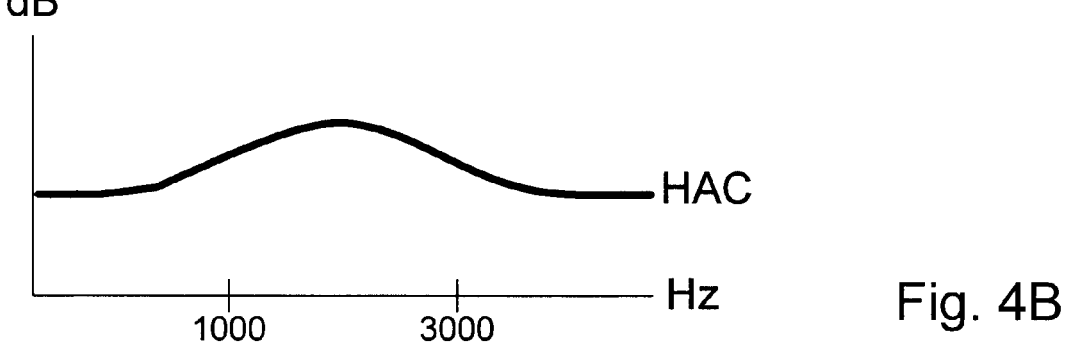

The operation of the receiver depicted in FIG. 3 will now be described. An equalizer, which in this example embodiment is implemented by the Digital Signal Processor (DSP) 32, provides a compensated received signal that compensates for the drop in the acoustic frequency response characteristic of the handset so that the frequency response characteristic of the handset is flat over the audible range of frequencies when the compensated received signal is applied. However, the compensated received signal causes the magnetic frequency response characteristic of the handset to be non-flat so that it is no longer in compliance with regulatory requirements. The acoustic and magnetic frequency response characteristics of the handset to the compensated received signal are depicted in FIGS. 4A and B.

Figure 5B:
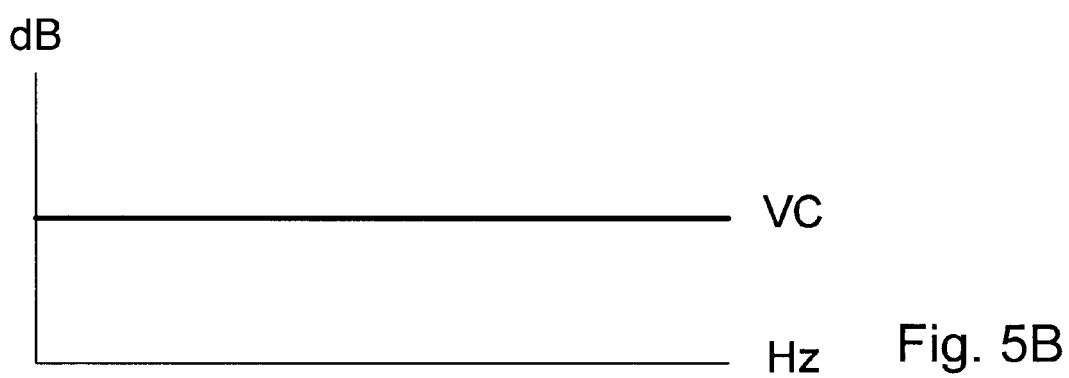
FIGS. 5A and B illustrate example acoustic and magnetic frequency response characteristics of the handset when the compensated received signal is applied to an example embodiment of the invention.
Figure 5A:
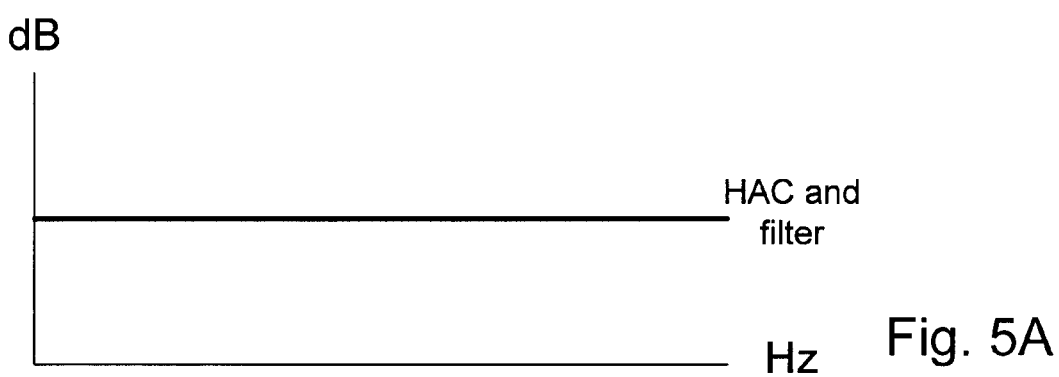

The filter 48 included in the printed circuit board is tuned to remove the bump in the acoustic frequency response characteristic of the handset caused by the compensated received signal. The substantially flat acoustic and magnetic frequency response characteristics of the handset over the audible range of frequencies with a voice coil, hearing aid coil, and filter coupled as depicted in FIG. 3 in response to the compensated received signal are depicted in FIGS. 5A and B.

Figure 6:
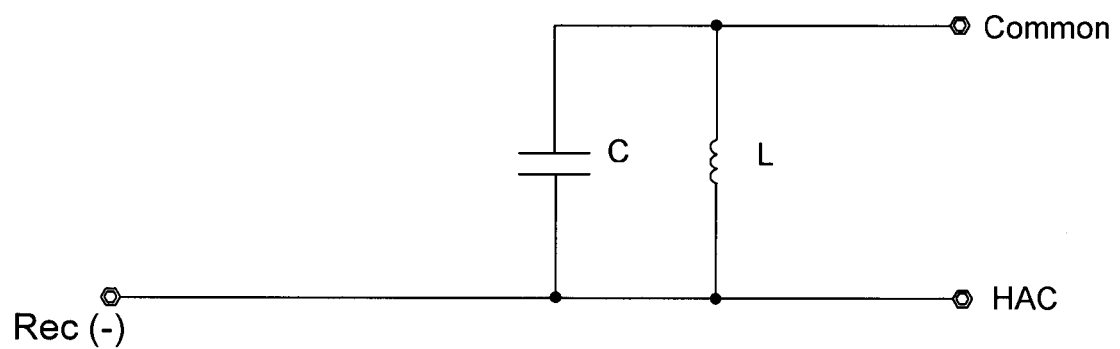
FIG. 6 illustrates an example LC filter.

In an example embodiment the voice and hearing aid coils and the filter are discrete parts. In an example embodiment, the filter is an LC (inductor/capacitor) filter as depicted in FIG. 6.

The embodiment described above allows the handset to meet all regulatory requirements pertaining to both the acoustic and frequency response characteristics of the handset.

Additionally, the embodiments described above allows the handset to be coupled to the standard positive and negative terminals of the phone base because the solution is contained entirely in the handset. This is advantageous due to the difficulties of wiring to the handset from the base phone because of limited space and limited cabling.

The invention has now been described with reference to the example embodiments. Alternatives and substitutions will now be apparent to persons of skill in the art. Although specific polarities were described in the example embodiments the specific signal polarities are not part of the invention. Additionally, some of the parts may be integrated due to design considerations. Further, the design of the filter will depend on the impedance characteristics of the voice coil and hearing aid coil and the specific design is not critical to practicing the invention. In some cases the filter may be implemented, for example, as an RLC filter. Accordingly, it is not intended to limit the invention except as provided by the appended claims.

What is claimed is:

1. A method comprising:
   receiving an uncompensated received signal for driving a voice coil and hearing aid coil included in the receiver of a handset, with the handset having an acoustic frequency response characteristic having a drop between about 1000 and 3000 hertz and having a substantially flat magnetic frequency response characteristic over the audible frequency range when driven by the uncompensated received signal;
   equalizing the uncompensated received signal to form a compensated received signal where the acoustic frequency response characteristic of the handset is substantially flat over the audible frequency range when driven by the compensated received signal; and
   filtering the compensated received signal applied to the hearing aid coil so that the magnetic frequency response characteristic of the handset is substantially flat over the audible frequency range when driven by the compensated received signal.

2. The method of claim 1 where the step of equalizing further comprises:
   digital signal processing of the received signal.

3. The method of claim 1 where the step of filtering further comprises:
   applying the compensated received signal to a circuit comprising a capacitive element and an inductive element.

4. An apparatus comprising:
   a receiver, included in a handset having first and second handset terminals, with the receiver having VC (Voice Coil), HAC (Hearing Aid Coil), and COMMON terminals, with the VC terminal coupled to the first handset terminal and the HAC terminal coupled to the second handset terminal;
   a voice coil, included in the receiver, having a first voice coil terminal coupled to the VC terminal and a second voice coil terminal coupled to the COMMON terminal;
   a hearing aid coil, included in the receiver, having a first hearing aid coil terminal coupled to the COMMON terminal and second hearing aid coil terminal coupled to the HAC terminal, and
   a filter having a first filter terminal coupled to the COMMON terminal and a second filter terminal coupled to the HAC terminal, with the filter tuned so that the magnetic frequency response of the handset is substantially flat over the audible range of frequencies when a compensated signal is coupled to the first and second handset terminals, where the acoustic frequency response of the handset to the compensated signal is substantially flat over the audible range of frequencies.

5. The apparatus of claim 4 further comprising:
   a base unit having first and second base terminals adapted to be coupled to the first and second handset terminals:
   an equalizer, included in the base unit, with the equalizer configured to generate a compensated signal that when applied to the voice coil causes the acoustic frequency response characteristic of the handset to be substantially flat over the audible frequency range.

6. The apparatus of claim 4 where the equalizer is a digital signal processor.

7. The apparatus of claim 4 where the filter causes the magnetic frequency response characteristic of the handset to be flat over the audible frequency range when the compensated signal is applied to the first and second handset terminals.

8. The apparatus of claim 4 where the filter comprises:
   an inductive element; and
   a capacitive element.

9. A system comprising:
   means for receiving an uncompensated received signal for driving a voice coil and hearing aid coil included in the receiver of a handset, with the handset having an acoustic frequency response characteristic having a drop between about 1000 and 3000 hertz and having a substantially flat magnetic frequency response characteristic over the audible frequency range when driven by the uncompensated received signal;
   means for equalizing the uncompensated received signal to form a compensated received signal where the acoustic frequency response characteristic of the handset is substantially flat over the audible frequency range when driven by the compensated received signal; and
   means for filtering the compensated received signal applied to the hearing aid coil so that the magnetic frequency response characteristic of the handset is substantially flat over the audible frequency range when driven by the compensated received signal.

10. The system of claim 9 where the means for equalizing further comprises:
   means for digital signal processing of the received signal.

11. The system of claim 9 where the means for filtering further comprises:
   means for applying the compensated received signal to a circuit comprising a capacitive element and an inductive element.

* * * * *